United States Patent [19]

Perry

[11] Patent Number: 5,159,057
[45] Date of Patent: Oct. 27, 1992

[54] METHOD FOR THE PREPARATION OF AROMATIC POLYESTERS

[75] Inventor: Robert J. Perry, Pittsford, N.Y.

[73] Assignee: Eastman Kodak Company, Rochester, N.Y.

[21] Appl. No.: 841,928

[22] Filed: Feb. 25, 1992

[51] Int. Cl.$^5$ .................... C08G 75/00; C08G 75/18; C08G 75/20; C08G 75/24
[52] U.S. Cl. .................... 528/391; 528/171; 528/373
[58] Field of Search .................. 528/171, 373, 391

[56] References Cited

U.S. PATENT DOCUMENTS

| | | | |
|---|---|---|---|
| 4,165,332 | 8/1979 | Beard et al. | 528/353 |
| 4,621,149 | 11/1986 | Fukuoka et al. | 560/24 |
| 4,868,271 | 9/1989 | Dahl et al. | 528/171 |
| 4,894,431 | 1/1990 | Armbruster et al. | 528/90 |
| 4,925,916 | 5/1990 | Harris et al. | 528/353 |
| 4,933,419 | 6/1990 | Perry et al. | 528/397 |
| 4,933,466 | 6/1990 | Perry et al. | 548/476 |
| 4,933,467 | 6/1990 | Perry et al. | 548/476 |
| 4,933,468 | 6/1990 | Perry et al. | 548/476 |
| 5,066,777 | 11/1991 | Van Leeuwen et al. | 528/392 |

FOREIGN PATENT DOCUMENTS 3431591 3/1986 Fed. Rep. of Germany.
1299256 12/1989 Japan.

OTHER PUBLICATIONS

Cacchi, S. et al., "Pd-Catalyzed Carbonylation of Aryl Triflates, Synthesis of Arenecarboxylic Acid Derivatives from Phenols", (1986), *Tetrahedron Letters*, vol. 27, No. 33, pp. 3931-3934.

Dolle, R. E. et al., "Palladium Catalyzed Alkoxycarbonylation of Phenols to Benzoate Esters", *J. Chem. Soc. Chem. Commun.*, (1987), pp. 904-905.

Aoki, S. et al., "Synthesis of 1,4-Dicarbonyl Compounds by Palladium-Catalyzed Carbonylative Arylation of Siloxycyclopropanes", SYNLETT, Dec. 1990, pp. 741-742.

Cacchi, S. et al., "Pd-Catalyzed Carbonylation of Enol Triflates, A Novel Method for One-Carbon Homologation of Ketones to Alpha, Beta-Unsaturated Carboxylic Acid Derivatives", (1985), *Tetrahedron Letters*, vol. 26, No. 8, pp. 1109-1112.

Chen, Q-Y, "Pd-Catalyzed Reaction of Phenyl Fluoroalkanesulfonates with Alkynes and Alkenes", (1986), *Tetrahedron Letters*, vol. 27, No. 10, pp. 1171-1174.

Eschavarren, A. M. et al., "Palladium-Catalyzed Carbonylative Coupling of Aryl Triflates with Organostannanes", *J. Am. Chem. Soc.*, (1988), vol. 110, pp. 1557-1565.

Mutin, R. et al., "Bi-Metallic Activation in Homogeneous Catalysis: Pd-Catalysed Carbonylation of Tricarbonyl (Chloroarene) Chromium Complexes to the Corresponding Aldehydes, Esters, Amides, and Alpha-Oxo Amides", (1988), *J. Chem. Soc., Chem. Commun.*, pp. 896-897.

Scott, W. J., "Pd-Catalyzed Coupling Reactions of Chloroaryl CR(CO)$_3$ Complexes", (1987), *J. Chem. Soc., Chem. Commun.*, pp. 1755-1756.

Yoneyama, M. et al. "Novel Synthesis of Aromatic Polyamides by Pd-Catalyzed Polycondensation of Aromatic Dibromides, Aromatic Diamines, and Carbon Monoxide," (1988), *Macromolecules*, Vol. 21, pp. 1908-1911.

*Primary Examiner*—John Kight, III
*Assistant Examiner*—T. Mosley
*Attorney, Agent, or Firm*—Robert L. Walker

[57] ABSTRACT

A method for preparing aromatic polyester comprising reacting carbon monoxide, a diol, and an aromatic trifluoromethane sulfonate reactant having the general formula

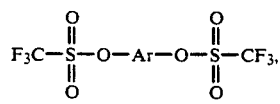

in the presence of solvent and a catalyst. Ar is selected from the group consisting of aromatic and heteroaromatic moieties having a total of ring carbons and heteroatoms of from 6 to about 30. The catalyst is a compound of a metal selected from the group consisting of platinum, palladium and nickel.

20 Claims, No Drawings

METHOD FOR THE PREPARATION OF AROMATIC POLYESTERS

CROSS-REFERENCE TO RELATED APPLICATIONS

This invention relates to the inventions disclosed in the following U.S. patent applications, which have been cofiled with this application, are commonly assigned and are incorporated herein by reference: METHOD FOR THE PREPARATION OF AROMATIC POLYAMIDES, by Robert J. Perry, U.S. Ser. No. 841,929, filed Feb. 25, 1992, and METHOD FOR THE PREPARATION OF AROMATIC POLY(IMIDEAMIDE)S, by Robert J. Perry, S. Richard Turner, and Richard W. Blevins, U.S. Ser. No. 841,926, filed Feb. 25, 1992.

BACKGROUND OF THE INVENTION

The present invention pertains to a process for the preparation of aromatic polyesters and more particularly pertains to a process for the preparation of aromatic polyester via a metal-mediated carbonylation and coupling reaction of an aromatic trifluoromethane sulfonate reactant and a diol.

Aromatic polyesters are widely used commercially and are commonly prepared by each of the following processes: (1) esterification of a hydroxycarboxylic acid, (2) esterification of a diol and a diacid, (3) ester interchange with an alcohol, (4) ester interchange with an ester, (5) esterification of acid chlorides, or (6) lactone polymerization. Ester interchange methods are often used because methyl esters are easier to purify than the diacids or diacid chlorides and by-product methanol is easily removed by distillation. These processes generally require the use of high temperatures, for example, in the range of 260° C., for polymer formation. This high temperature requirement has a number of shortcomings, the most notable is increased energy consumption. An alternative process for the preparation of aromatic polyesters is disclosed in U.S. Pat. No. 4,933,419 to R. J. Perry and S. R. Turner. That process is a palladium catalyzed carbonylation and coupling of diols and diiodoaromatic polymeric esters, which can be performed at lower temperatures than ester interchange methods. That process, however, requires diiodo compounds and produces by-product hydrogen iodide. Recycling of iodide can present practical difficulties.

Ester formation from trifloromethane sulfonates is reported in Dolle et al, Journal of the Chemical Society, Chemical Communications, (1987) pp 904-905 and Cacchi, S., et al, Tetrahedron Letters, Vol. 27, No. 33, (1986) pp 3931-3934. Neither of these publications teaches or suggests the preparation of polymers.

SUMMARY OF THE INVENTION

It is an object of the invention to provide an improved method for the preparation of aromatic polyesters. In the broader aspects of the invention, there is provided a method for preparing aromatic polyester comprising reacting carbon monoxide, a diol, and an aromatic trifluoromethane sulfonate reactant having the general formula

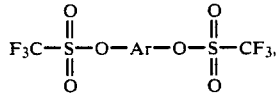

in the presence of solvent and a catalyst Ar is selected from the group consisting of aromatic and heteroaromatic moieties having a total of ring carbons and heteroatoms of from 6 to about 30. The catalyst is a compound of a metal selected from the group consisting of platinum, palladium and nickel.

DESCRIPTION OF A SPECIFIC EMBODIMENT

Aromatic polyesters are very widely used as fibers and engineering plastics.

In the method of the invention, aromatic polyesters are prepared by the metal-mediated carbonylation and coupling of an aromatic trifluoromethane sulfonate reactant having the general formula

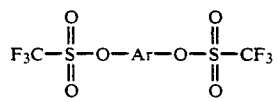

and a diol.

Ar is aromatic or heteroaromatic. In a particular embodiment of the invention, Ar is an aromatic or heteroaromatic moiety having from 1 to 5, five or six membered rings. The rings are solitary or linked or fused and are substituted or unsubstituted. Linked rings can be joined by a direct link or a linking group selected from the group consisting of arylene, heteroarylene, fused arylene, alkyl or haloalkyl groups of from 1 to 10 carbons, —O—, —S—,

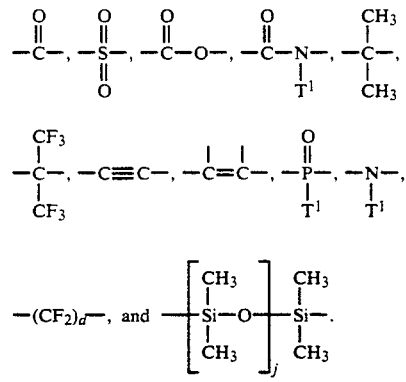

Each $T^1$ is independently selected from the group consisting of alkyl, aryl and heteroaryl; d is an integer from 1 to about 12; and j is an integer between 0 and 300. Suitable Ar groups include phenyl, naphthyl, anthracyl, phenanthryl, biphenyl, phenylether, diphenylsulfone, diphenylketone, diphenylsulfide, pyridine, and quinoline.

The trifluoromethane sulfonate groups are bonded to the same or different aromatic rings in the moiety and are each non-ortho to other ring substituents. Those other ring substituents are "unreactive", that is, they do not have a deleterious effect, for example, steric hindrance or electronic deactivation of the polymerization reaction. Additional substituents can be groups that introduce branching, for example, additional trifluoromethane sulfonate groups, however, branching can affect the rheological and physical properties of the polymer. It is preferred that the total of trifluoromethane sulfonate groups on the aromatic trifluoromethane sulfonate reactant be two.

Representative aromatic trifluoromethane sulfonate reactants having a propensity to introduce branching include the tri(trifluoromethane sulfonate)s: phenyl-1,3,5-tris(trifluoromethane sulfonate); naphthyl-2,4,7-tris(trifluoromethane sulfonate); biphenyl-3,3',5-tris(trifluoromethane sulfonate); 3,3',5-tris(trifluoromethane sulfonate) diphenylether; 2,4,4'-tris(trifluoromethane sulfonate) diphenylether; 3,3',5-tris(trifluoromethane sulfonate) diphenylsulfone. Representative aromatic trifluoromethane sulfonate reactants not having an additional substituent likely to cause branching include the di(trifluoromethane sulfonate)s: 2,2-bis(4-trifluoromethanesulfanatophenyl)propane; 4,4'-bis(trifluoromethanesulfanato)biphenyl; phenyl-1,3-bis(trifluoromethane sulfonate); phenyl-1,4-bis(trifluoromethane sulfonate); 4,4'-bis(trifluoromethane sulfonato)diphenylsulfone; 4,4'-bis(trifluoromethanesulfonato)diphenylether; 3,4'-bis(trifluoromethanesulfonato)diphenylether; 4,4'-bis(trifluoromethanesulfonato)benzophenone; 5-trifluoromethanesulfonato-3-(4-trifluoromethanesulfonatophenyl)-1,1,3-trimethylindane; and 2,2-bis(4-trifluoromethane-sulfonatophenyl)hexafluoropropane.

The method of the invention is not limited to any particular diol. It is convenient to utilize in the method of the invention, a diol known as a starting material for the preparation of polyester. The diol used can include additional functional groups, as long as those groups are "unreactive" in the sense presented above, that is, not having a deleterious effect, for example, steric hindrance or electronic deactivation of the polymerization reaction. Additional functional groups on the diol can be groups that introduce branching, for example, additional hydroxyl groups, however, branching can affect the rheological and physical properties of the polymer and the inclusion of such "branching groups" is not preferred. The diol used can be aliphatic or aromatic or heteroaromatic. Suitable diols include compounds having the general formulas: $HOCH_2(CH_2)_jCH_2OH$, in which j is an integer from 0 to 20; $HO-(CH_2-CH_2-O)_n-H$, in which n is an integer from 1 to 100; and $HO-Ar-OH$, in which Ar represents the same moieties as discussed above in relation to the aromatic trifluoromethane sulfonate reactant, but is independently selected. Representative compounds suitable for the method of the invention include: ethylene glycol; polyethylene glycolols; 1,4butanediol; 1,6-hexanediol; 1,4-cyclohexanediol; 1,4-cyclohexanedimethanol; 2,2,4,4-tetramethylcyclobutanediol;

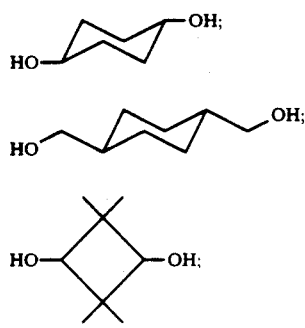

2,2-bis[4-(hydroxyethoxy)phenyl)propane; 1,4-dihydroxymethylbenzene; bisphenol A (4,4'-isopropylidenediphenol); 4,4'bicylo(2.2.1)hept-2-ylidenebisphenol; 4,4'-(octahydro-4,7-methano-5H-inden-5-ylidene)bisphenol; 4,4'-dihydroxybenzophenone; 3,6-dihydroxybenzonorbornane; 2,2-bis(3,5-dichloro-4-hydroxyphenyl)propane; 2,2-bis(3,5-dibromo-4-hydroxyphenyl)propane; 1,5-naphthalenediol; 4,4'-dihydroxybiphenyl; 2,2-bis(4-hydroxyphenyl)propane; 1,4-dihydroxybenzene; 1,3-dihydroxybenzene; and 2,2-bis(4-hydroxyphenyl)hexafluoropropane.

The particular diol selected depends upon the polyester desired. For example, polyesters having an appreciable degree of crystallinity can be produced using symmetrical diols which have the general formula: $HOCH_2(CH_2)_jCH_2OH$, in which j is an integer from 0 to 4. Diols of this type are illustrated by ethylene glycol, 1,4-butanediol, and 1,6-hexanediol. Alternatively, non-crystalline polyesters can be produced using asymmetrical aliphatic diols, such as, hydroxy terminated block copolymers and oligomers having the general structure

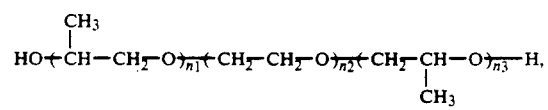

marketed under the name "Pluronics" by BASF Corp., Performance Chemicals, of Parsippany, N.J. Although reactants are discussed herein as individual compounds, the method of this application is not limited to reactions utilizing individual compounds as reactants, but is also inclusive of reactions utilizing mixtures of compounds as reactants. The method of the invention is not limited to any particular aromatic trifluoromethane sulfonate reactant or combination of aromatic trifluoromethane sulfonate reactants, nor to any particular diol or combination of diols, however it is necessary that selected reactants react under the reaction conditions employed to form the aromatic polyester. It is desirable that the reactants be sufficiently stable under the reaction conditions employed and that the reactants not be subject to an unacceptable amount of undesirable side reactions, to prevent the formation of an unacceptable amount of by-product. It is also desirable that the reactants be free of groups which unduly retard the reaction by steric hindrance or by lowering the activity of the catalyst.

The reactants are contacted with carbon monoxide. It is convenient to add an excess of carbon monoxide to the reaction zone. The excess of carbon monoxide need not be measured; one can merely pressurize the vessel with carbon monoxide to the desired reaction pressure. Carbon monoxide can be at, or below atmospheric pressure or at a higher pressure.

In the disclosed embodiments of the invention, the reaction step is conducted in the presence of an organic solvent, which appreciably dissolves reactants to provide a liquid reaction medium, which facilitates the contacting of the reactants and the catalyst. It is desirable that the solvent be "inert" to the reaction, i.e., that the solvent not enter into the reaction in an undesired way. The invention is not limited to a particular solvent or solvent system and a wide variety of organic compounds can be used. In a particular embodiment of the invention, exemplary solvents are hydrocarbon solvents, such as toluene and ether solvents, for example: tetrahydrofuran, diglyme (2-methoxyethyl ether), and glyme (1,2-dimethoxyethane). In another embodiment of the invention, a desirable solvent is dipolar and aprotic, that is, the solvent has a highly polar molecule with hydrogens that are not easily abstractable. Exemplary dipolar aprotic solvents include dimethylformamide; dimethylacetamide; dimethylsulfoxide; 1,3-dimethyl-2-imidazolidinone; hexamethylphosphoramide; N-methylpyrrolidinone; N-cyclohexylpyrrolidinone; and dimethylimidazolidinone.

The amount of solvent present is not critical to the reaction, however, it is desirable to use enough solvent to facilitate the reaction. Specific polymers may have optimum concentrations in various solvents. There is no theoretical upper limit on the amount of solvent employed, however, practical limits are imposed by the size of the reaction vessel, the ease of separation of product from the reaction medium, cost and other factors. It is ordinarily desirable that the amount of solvent used be within the range of from about 0.1 and about 1000 parts by weight based on the volume of aromatic trifluoromethane sulfonate reactant used. It is also ordinarily desirable that the reaction medium be agitated, for example, by stirring, to facilitate mixing of gaseous carbon monoxide.

The process of the invention is carried out in the presence of a catalyst. The catalyst is a transition metal catalyst in which platinum, nickel or palladium is present in the zero valent or divalent state. Palladium is preferred. The catalysts have one or more ligands bonded to one or more transition metal atoms by ionic or covalent bonds. Representative palladium catalysts include simple palladium salts such as $PdX_2$, which X is Cl, Br or I and the other palladium catalysts listed in Table 1.

TABLE 1

| Palladium catalysts | |
|---|---|
| $Pd^{-2}$ | |
| $PdX_2L_2$ | X = Cl, Br, I |
| | L = $R_3P$, |
| | where R = alkyl or aryl |
| $Pd(OAc)_2$ | OAc = acetate |
| $Pd(OAc)_2L_2$ | OAc = acetate |
| $PdCl_2(RCN)_2$ | R = $CH_3$, Phenyl |
| $PhPdXL_2$ | X = Br, I |
| $PdCl_2(COD)_2$ | COD = cis, cis-1,5-cyclooctadiene |
| $Pd(acac)_2$ | acac = 2,4-pentanedionate |
| $PdCl_2DPPF$ | DPPF = 1,1'-bis-(diphenylphosphino)ferrocene |
| $PdCl_2DPPE$ | DPPE = 1,2-bis(diphenylphosphino)ethane |
| $PdCl_2DPPP$ | DPPP = 1,3-bis(diphenylphosphino)propane |
| $PdCl_2DPPB$ | DPPB = 1,4-bis(diphenylphosphino)butane |
| $Pd^{(0)}$ | |
| $PdL_4$ | L = $R_3P$, where R = alkyl or aryl |
| $Pd_2($$)_3$ | |
| $Pd(DPPE)_2$ | DPPE = 1,2-bis(diphenylphosphino)ethane |
| $Pd(DPPP)_2$ | DPPP = 1,3-bis(diphenylphosphino)propane |
| $Pd(DPPB)_2$ | DPPB = 1,4-bis(diphenylphosphino)butane |

A catalytic amount of catalyst is employed. By "catalytic amount" is meant an amount of catalyst which catalyzes the reaction to the desired extent. Generally, the amount of catalyst is at least about 0.01 mole percent based on the amount of aromatic trifluoromethane sulfonate reactant. There is no real upper or lower limit on the amount of catalyst, this being defined by secondary considerations such as cost and ease of separation of the catalyst from products and unreacted reactants. A preferred catalytic amount is from about 0.005 to about 0.20 moles per mole of aromatic trifluoromethane sulfonate reactant. The catalyst can be bound to a support or unsupported.

The reaction can take place in the presence of an activating ligand, such as phosphine or arsine ligand. Such a ligand can be used with a catalyst, for example, triphenylphosphine with bis(triphenylphosphine) palladium(II) chloride, to increase the rate of the catalyzed reaction. The amount of ligand used is desirably between about 0.01 mole and about 5.0 moles per mole of metal catalyst, and more desirably at about 2 moles per mole of metal catalyst. It is believed that the presence of the activating ligand speeds up the oxidative addition of such catalysts to the aromatic trifluoromethane sulfonate reactant by making the catalyst more nucleophilic.

The process of this invention preferably includes the neutralization of by-product trifluoromethane sulfonic acid, for example, by conducting the reaction in the presence of base. The base can be a tertiary amine such as tributylamine, pyridine, 1,8-diazobicyclo[5,4,0]-7-undecene (DBU), 1,5-diazobicyclo[4,3,0]non-5-ene (DBN) or have the formula:

$NR_3$ wherein each R is independently selected from lower alkyl groups having from about 2 to about 6 carbon atoms. The base can be immobilized on a cross-linked polymer such as cross-linked poly(vinylpyridine) beads. Alternatively, the base can be another type of basic substance which does not react with the reactants, e.g., a metal carbonate such as $K_2CO_3$ or a metal hydroxide such as $Ca(OH)_2$ or a metal acetate such as sodium acetate. Generally, one employs at least enough base to react with the by-product trifluoromethane sulfonic acid produced. An excess can be used, if desired. As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other means can be substituted in this invention to achieve similar results.

The process of this invention is preferably conducted at a temperature within the range of from about room temperature, i.e., about 20° C., to about 250° C. A desirable temperature range is from about 70° C. to about 150° C. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used.

The method of the invention is not limited by a particular theory or explanation, however, a theoretical explanation can be provided. It is believed that the method of the invention includes the following reaction mechanism sequence, in which the polymer formation step further comprises an oxidative addition step, a carbon monoxide insertion step and a coupling step. In that reaction sequence, a palladium(0) catalyst, which can be introduced as a palladium(0) complex or as a palladium(II) species which is subsequently reduced in situ, undergoes oxidative addition to a trifluoromethane sulfonate compound generating an aryl palladium(II) trifluoromethane sulfonate intermediate. The ligands on palladium can be CO, phosphines or amines. Since the palladium catalyst is present in small quantities relative to the trifluoromethane sulfonate compound, it is unlikely that bis(aryl palladium(II) trifluoromethane sulfonate) intermediates are formed to any great degree, but the oxidative addition reaction takes place at both trifluoromethane sulfonate groups of trifluoromethane sulfonate reactant compounds at some point during the reaction. Then CO insertion generates an acyl palladium(II) trifluoromethane sulfonate complex. This electrophilic acyl palladium complex is then attacked by the diol in the coupling reaction. The trifluoromethane sulfonic acid which is liberated is neutralized by the added base and the palladium(0) catalyst is regenerated. This mechanism sequence is illustrated below for the reaction of 4,4'-isopropylidene-diphenol trifluoromethane sulfonate reactant and bisphenol A.

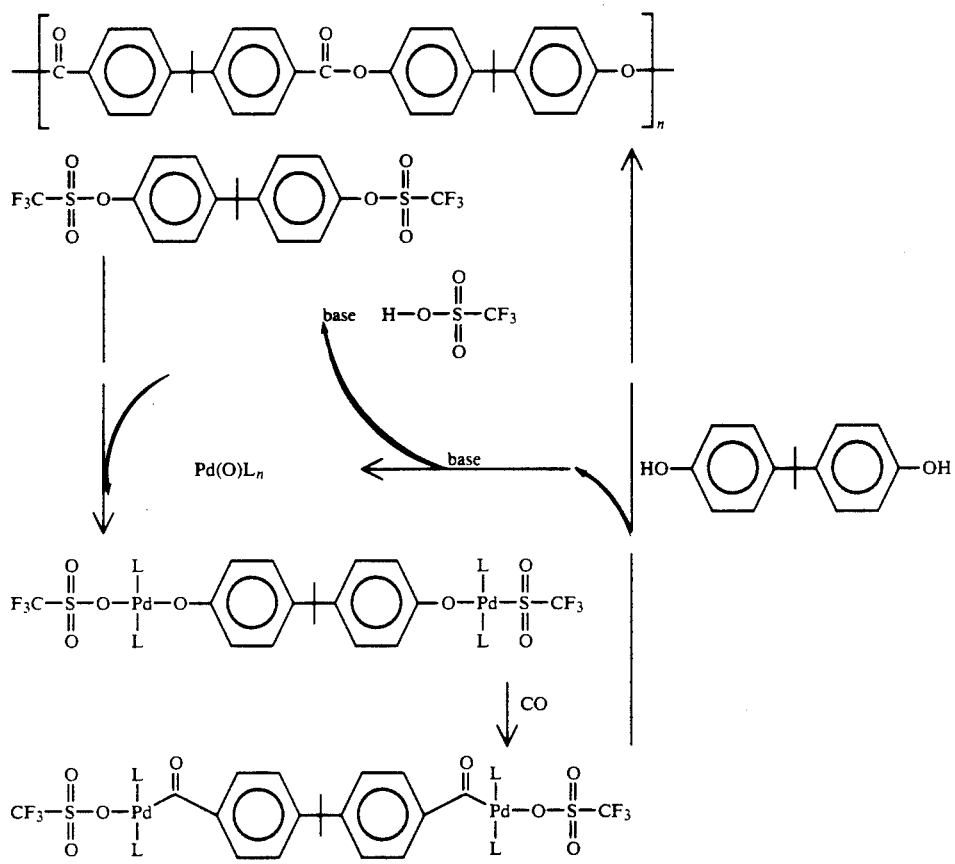

The following Examples are presented for a further understanding of the invention. Table 2 lists reactants and other materials used, quantities and other information for all of the Examples.

EXAMPLE 1

A Fischer-Porter bottle equipped with a Teflon coated stir-bar, a pressure guage, a pressure release valve, a gas inlet and a straight ball valve for degassing and sample withdrawl was charged with aromatic trifluoromethanesulfonate reactant, diol reactant, catalyst, ligand and solvent, as indicated in Table 2. The reaction mixture was degassed and placed under 1 atmosphere (1.0 kg/cm$^2$) of carbon monoxide. After stirring for 1 minute at 115° C., the base was added and the reaction vessel was pressurized to 7.7 kg/cm$^2$ with carbon monoxide. The reaction was allowed to continue for 18 hours after which time the mixture was filtered through filter aid, and precipitated into methanol. The polymer was washed extensively with methanol, and dried in vacuo to give 1.42 grams of polymer at a yield of 89%. The inherent viscosity of the polymer was determined by analyzing a 0.25 weight/weight percent solution of the polymer at 25° C. with a Schott Gerate 526-10 viscometer. Infrared spectra were recorded on a Nicolet 5ZDX spectrometer as KBr pellets. Size exclusion chromatography data was obtained from a Waters HPLC using $\mu$-styragel columns of $10^6, 10^5, 10^4, 10^3$ Angstroms calibrated against poly(methylmethacrylate) standards in dimethylformamide to obtain weight average and number average molecular weight determinations (also referred to herein as $M_w$ and $M_n$, respectively). Results are presented in Table 2.

EXAMPLE 2

The same procedures were followed and results are presented as in Example 1, with the exceptions that reactants differed, as indicated in Table 2 and the reaction was allowed to continue for 16 hours, after which time the mixture was filtered. The insoluble fraction was washed extensively with methanol and dried in vacuo to give 1.13 grams of soluble polymer. The filtrate was precipitated into methanol and washed extensively with methanol and dried in vacuo to give 1.13 grams of soluble polymer. Results presented in Table 2 are for the soluble polymer.

EXAMPLE 3

The same procedures were followed and results are presented as in Example 1, with the exceptions that reactants differed, as indicated in Table 2, the reaction was allowed to continue for 24 hours and the yield was 533 milligrams.

EXAMPLE 4

The same procedures were followed and results are presented as in Example 1, with the exceptions that reactants differed, as indicated in Table 2 and the yield was 816 milligrams.

EXAMPLE 5

The same procedures were followed and results are presented as in Example 1, with the exceptions that reactants differed, as indicated in Table 2, the reaction was allowed to continue for 23 hours and the yield was 715 milligrams.

TABLE 2

| | EXAMPLE | | | | |
|---|---|---|---|---|---|
| | 1 | 2 | 3 | 4 | 5 |
| Aromatic trifluoromethane sulfonate reactant concentration (millimolar) | | | | | |
| 2,2-bis(4-trifluoromethane sulfonatophenyl)propane | 3.36 | — | — | — | 3.00 |
| 4,4'-bis(trifluoromethane sulfonato)biphenyl | — | 5.81 | — | — | — |
| phenyl-1,3-trifluoromethane sulfonate | — | — | 3.00 | 3.00 | — |
| Diol concentration (millimolar) | | | | | |
| bisphenol A | 3.36 | — | 3.00 | — | — |
| 4,4'-bicyclo[2.2.1]hept-2-ylidenebisphenol | — | 5.81 | — | 3.00 | — |
| 2,2-bis(4-hydroxyphenyl)hexafluoropropane | — | — | — | — | 3.00 |
| Solvent volume (in milliliters) | | | | | |
| Dimethylacetamide | 10.2 | 17.6 | 9.1 | 9.1 | 9.1 |
| Catalyst concentration (millimolar) | | | | | |
| PdCl₂DPPE | 0.202 | 0.35 | 0.09 | 0.09 | 0.09 |
| Ligand concentration (millimolar) | | | | | |
| 1,2-bis(diphenylphosphino)ethane | 0.202 | 0.35 | 0.09 | 0.09 | 0.09 |

TABLE 2-continued

| | EXAMPLE | | | | |
|---|---|---|---|---|---|
| | 1 | 2 | 3 | 4 | 5 |
| Base concentration (millimolar) | | | | | |
| 1,8-diazabicyclo[5.4.0] undec-7-ene (DBU) | 8.06 | 13.94 | 7.2 | 7.2 | 7.2 |
| Temperature (°C.) | 115° | 115° | 115° | 115° | 115° |
| CO pressure (kg/cm²) | 7.7 | 7.7 | 7.7 | 7.7 | 7.7 |
| Reaction time (in hours) | 17 | 16 | 23 | 18 | 23 |
| $\eta_{inh}$ | | | | | |
| $T_g$ (°C.) | 170 | 211 | 103 | 184 | 180 |
| $M_w$ | 7600 | 3100 | 2200 | 1800 | 3400 |
| $M_n$ | 4200 | 2000 | 1500 | 1400 | 2300 |
| Infrared absorption peaks (in cm⁻¹) | | | | | |
| | 2969 | 2959 | 2968 | 2958 | 2971 |
| | 1737 | 2872 | 1736 | 2872 | 1739 |
| | 1607 | 1735 | 1606 | 1736 | 1607 |
| | 1506 | 1605 | 1505 | 1605 | 1508 |
| | 1266 | 1504 | 1265 | 1504 | 1264 |
| | 1208 | 1265 | 1207 | 1266 | 1209 |
| | 1171 | 1207 | 1171 | 1206 | 1173 |
| | 1067 | 1170 | 1067 | 1170 | 1067 |
| | 1015 | 1073 | 1015 | 1074 | 1015 |
| | | 1015 | | 1015 | |

Table 3 shows the repeating unit structural formulas of polymers produced by the method of the invention and supported by the data presented in Table 2.

TABLE

| Example | Polyester repeating unit |
|---|---|
| 1 | [structural formula: polyester with biphenyl dicarbonyl and bisphenol A units] |
| 2 | [structural formula: polyester with biphenyl dicarbonyl and bicyclo[2.2.1]hept-2-ylidenebisphenol units] |
| 3 | [structural formula: polyester with phenyl-1,3-dicarbonyl and bisphenol A units] |
| 4 | [structural formula: polyester with phenyl-1,3-dicarbonyl and bicyclo[2.2.1]hept-2-ylidenebisphenol units] |
| 5 | [structural formula: polyester with biphenyl dicarbonyl and hexafluoroisopropylidenebisphenol (CF₃) units] |

The method of the invention provides the advantages of utilizing aromatic trifluoromethane sulfonate reactants. These compounds are much less water sensitive than diacid chlorides. The method of the invention can be carried out at a temperature between 100° and 120° C. The recycling of trifluoromethane sulfonic acid is more favorable than the recycling of hydrogen iodide.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing aromatic polyester comprising reacting carbon monoxide, a diol, and an aromatic trifluoromethane sulfonate reactant having the general formula

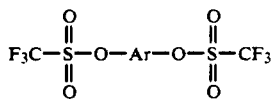

wherein Ar is selected from the group consisting of aromatic and heteroaromatic moieties having a total of ring carbons and heteroatoms of from 6 to about 30, in the presence of solvent and catalyst, said catalyst being selected from the group consisting of platinum compounds, palladium compounds, and nickel compounds.

2. The method of claim 1 wherein each said trifluoromethane sulfonate group is non-ortho.

3. The method of claim 1 further comprising neutralizing trifluoromethane sulfonic acid.

4. The method of claim 1 wherein said catalyst is a palladium catalyst.

5. The method of claim 1 wherein Ar is selected from the group consisting of arylene and heteroarylene groups having five or six membered rings, fused systems of said rings, directly linked systems of said rings, or linked systems of said rings having bridge members selected from the group consisting of arylene, heteroarylene, fused arylene, alkyl or haloalkyl groups of from 1 to 10 carbons, —O—, —S—,

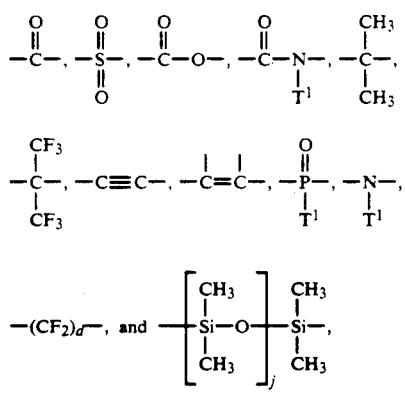

wherein each $T^1$ is independently selected from the group consisting of alkyl, aryl and heteroaryl; d is an integer from 1 to about 12; and j is an integer between 0 and 300.

6. The method of claim 1 wherein Ar is a moiety selected from the group consisting of phenyl, naphthyl, anthracyl, phenanthryl, biphenyl, phenylether, diphenylsulfone, diphenylketone, diphenylsulfide, pyridine, quinoline.

7. The method of claim 1 wherein said diol is aliphatic.

8. The method of claim 1 wherein said diol has the general formula $HOCH_2(CQ_2)_jCH_2OH$, wherein j is an integer from 0 to 4, and Q is H or F.

9. The method of claim 1 wherein said diol has an aromatic or heteroaromatic nucleus having a total of ring carbons and heteroatoms of from 6 to about 30.

10. The method of claim 1 wherein said aromatic trifluoromethane sulfonate reactant is selected from the group consisting of phenyl-1,3,5-tris(trifluoromethane sulfonate); naphthyl-2,4,7-tris(trifluoromethane sulfonate); biphenyl-3,3',5-tris(trifluoromethane sulfonate); 3,3',5-tris(trifluoromethane sulfonate) diphenylether; 2,4,4'-tris(trifluoromethane sulfonate) diphenylether; 3,3',5-tris(trifluoromethane sulfonate) diphenylsulfone; 2,2-bis(4-trifluoromethanesulfanatophenyl)propane; 4,4'-bis(trifluoromethanesulfanato)biphenyl; phenyl-1,3-bis(trifluoromethane sulfonate); phenyl-1,4-bis(trifluoromethane sulfonate); 4,4'-bis(trifluoromethane sulfonato)diphenylsulfone; 4,4'-bis(trifluoromethanesulfonato)diphenylether; 3,4'-bis(trifluoromethanesulfonato)diphenylether; 4,4'-bis(trifluoromethanesulfonato)benzophenone; 5-trifluoromethanesulfonato-3-(4-trifluoromethanesulfonatophenyl)-1,1,3-trimethylindane; and 2,2-bis(4-trifluoromethanesulfonatophenyl) hexafluoropropane.

11. The method of claim 10 wherein said diol is selected from the group consisting of ethylene glycol, 1,4-butanediol, and 1,6-hexanediol, 2,2-dimethyl-1,3-propanediol, 4,4'-isopropylidenediphenol.

12. The method of claim 1 wherein said diol is selected from the group consisting of ethylene glycol, 1,4-butanediol, and 1,6-hexanediol, 2,2-dimethyl-1,3-propanediol, 4,4'-isopropylidenediphenol.

13. The method of claim 1 wherein said method is conducted at a temperature from about 70° to about 150° C.

14. The method of claim 1 wherein said catalyst is a palladium compound having a palladium atom in the zero valent or divalent state.

15. The method of claim 1 wherein said catalyst is selected from the group consisting of $PdCl_2$, $PdBr_2$, $PdI_2$, $PdCl_2(R^1{}_3P)_2$, $PdBr_2(R^1{}_3P)_2$, $PdI_2(R^1{}_3P)_2$, $Pd(R^2)_2$, $Pd(R^2)_2(R^1{}_3P)_2$, $PdCl_2(R^3CN)_2$, $PhPdBr(R^1{}_3P)_2$, $PhPdI(R^1{}_3P)_2$, $PdCl_2$(cis, cis-1,5-cyclooctadiene)$_2$, Pd(2,4-pentanedionate)$_2$, $PdCl_2$(1,1'-bis(diphenylphosphino)ferrocene), $PdCl_2$(1,2-bis(diphenylphosphino)ethane), $PdCl_2$(1,3-bis(diphenylphosphino)propane), $PdCl_2$(1,4-bis(diphenylphosphino)butane), $Pd(R^1{}_3P)_4$,

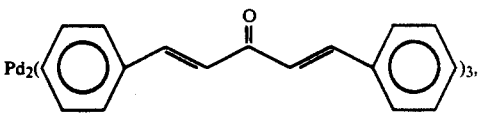

Pd(1,2-bis(diphenylphosphino)ethane)$_2$, Pd(1,3-bis(diphenylphosphino)propane)$_2$, and Pd(1,4-bis(diphenylphosphino)butane)$_2$, wherein $R^1$ is alkyl or aryl, $R^2$ is acetate, and $R^3$ is $CH_3$ or phenyl.

16. A method for preparing aromatic polyester in the presence of catalyst and solvent, comprising reacting carbon monoxide, a diol having the general formula HO—Ar—OH, and an aromatic trifluoromethane sulfonate reactant having the general formula

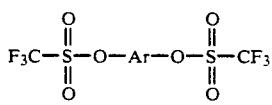

wherein each said Ar is independently selected from the group consisting of arylene or heteroarylene, each said trifluoromethane sulfonate group is non-ortho, in the presence of solvent and a n catalyst having a palladium atom in the zero valent or divalent state.

17. The method of claim 16 further comprising neutralizing trifluoromethane sulfonic acid.

18. The method of claim 17 wherein said catalyst is selected from the group consisting of $PdCl_2$, $PdBr_2$, $PdI_2$, $PdCl_2(R^1{}_3P)_2$, $PdBr_2(R^1{}_3P)_2$, $PdI_2(R^1{}_3P)_2$, $Pd(R^2)_2$, $Pd(R^2)_2(R^1{}_3P)_2$, $PdCl_2(R^3CN)_2$, $PhPdBr(R^1{}_3P)_2$, $PhPdI(R^1{}_3P)_2$, $PdCl_2$(cis, cis-1,5-cyclooctadiene)$_2$, Pd(2,4-pentanedionate)$_2$, $PdCl_2$(1,1'-bis(diphenylphosphino)ferrocene), $PdCl_2$(1,2-bis(diphenylphosphino)ethane), $PdCl_2$(1,3-bis(diphenylphosphino)propane), $PdCl_2$(1,4-bis(diphenylphosphino)butane), $Pd(R^1{}_3P)_4$,

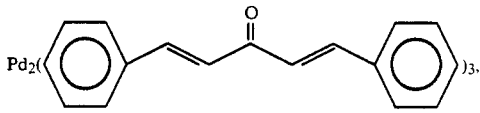

Pd(1,2-bis(diphenylphosphino)ethane)$_2$, Pd(1,3-bis(diphenylphosphino)propane)$_2$, and Pd(1,4-bis(diphenylphosphino)butane)$_2$, wherein $R^1$ is alkyl or aryl, $R^2$ is acetate, and $R^3$ is $CH_3$ or phenyl.

19. The method of claim 17 wherein Ar is an aromatic or heteroaromatic moiety having from 1 to 5, five or six membered rings, said rings being solitary or fused or joined by a direct link or joined by a linking group.

20. The method of claim 18 wherein said linked rings are joined by a linking group selected from the group consisting of arylene, heteroarylene, fused arylene, alkyl or haloalkyl groups of from 1 to 10 carbons, —O—, —S—,

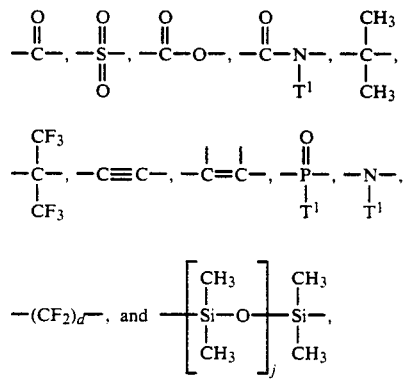

wherein each $T^1$ is independently selected from the group consisting of alkyl, aryl and heteroaryl; d is an integer from 1 to about 12; and j is an integer between 0 and 300.

* * * * *